United States Patent
Chen et al.

(10) Patent No.: US 8,462,805 B2
(45) Date of Patent: Jun. 11, 2013

(54) GRACEFUL RESTART METHOD OF ROUTER, ROUTER AND COMMUNICATION NETWORK THEREOF

(75) Inventors: Ying Chen, Shenzhen (CN); Lifen Ye, Shenzhen (CN); Jingming Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 352 days.

(21) Appl. No.: 12/815,243

(22) Filed: Jun. 14, 2010

(65) Prior Publication Data

US 2010/0260199 A1 Oct. 14, 2010

Related U.S. Application Data

(63) Continuation of application No. PCT/CN2008/073500, filed on Dec. 12, 2008.

(30) Foreign Application Priority Data

Dec. 13, 2007 (CN) .......................... 2007 1 0125062

(51) Int. Cl.
*H04L 12/54* (2006.01)

(52) U.S. Cl.
USPC ........... 370/428; 370/216; 370/217; 370/218; 370/219; 370/220; 370/221; 370/222; 370/223; 370/224; 370/225; 370/226; 370/227; 370/228; 370/241; 709/220; 709/221; 709/222; 709/223; 709/224; 709/225; 709/226; 709/227; 709/228; 709/229

(58) Field of Classification Search
USPC ................. 370/216–228, 241–253, 389–440; 709/220–229
See application file for complete search history.

(56) References Cited

U.S. PATENT DOCUMENTS 7,359,377 B1 * 4/2008 Kompella et al. ............. 370/389
2003/0210705 A1 11/2003 Seddigh et al.

FOREIGN PATENT DOCUMENTS

| CN | 1555163 A | 12/2004 |
| CN | 1599325 A | 3/2005 |
| CN | 101072187 A | 11/2007 |

OTHER PUBLICATIONS

Supplementary European Search Report dated Nov. 5, 2010 in connection with European Patent Application No. EP 08 86 7893.
Y. Rekhter, et al., "Graceful Restart Mechanism for BGP with MPLS", Internet Engineering Task Force, Jan. 2007, 10 pages.
S. Sangli, et al., "Graceful Restart Mechanism for BGP", Internet Engineering Task Force, Jan. 2007, 15 pages.

(Continued)

*Primary Examiner* — Charles C Jiang

(57) ABSTRACT

A graceful restart (GR) method of a router, and a router and a communication network thereof are provided. The method includes the following steps. A control plane enters a GR state. Label switched path (LSP) packets sent by a neighbor router are received, and the label information of the control plane is recovered according to the LSP packets. Whether the label information is completely recovered is determined. If the label information is completely recovered, the GR state is exited, and label information of a forwarding plane is updated according to the recovered label information of the control plane. The GR method of a router, the router, and the communication network decide whether to exit the GR state by detecting whether the label information of the control plane is completely recovered. This can precisely control the time of exiting the GR state is controlled and improve the reliability of the router.

11 Claims, 13 Drawing Sheets

OTHER PUBLICATIONS

M. Leelanivas, et al., "Graceful Restart Mechanism for Label Distribution Protocol", Internet Engineering Task Force, Feb. 2003, 12 pages.

Zhiyu Zhou, et al., "GMPLS RSVP-TE Signaling Recovery with Graceful Restart in Optical User Network Interface", Optical Fiber communication Conference and Exposition National Fiber Optic Engineers Conference, Mar. 25-29, 2007, 7 pages.

Rajiv Asati, et al., "LDP End-of-LIB", Network Working Group Internet Draft, Nov. 2007, 8 pages.

A. Farrel, "Fault Tolerance for the Label Distribution Protocol (LDP)", Network Working Group, Feb. 2003, 47 pages.

European Search Report dated Nov. 15, 2011 in connection with European Patent Application No. EP 11 00 6964.

International Search Report issued Mar. 26, 2009 in connection with International Patent Application No. PCT/CN2008/073500.

Written Opinion of the International Searching Authority dated Mar. 26, 2009 in connection with International Patent Application No. PCT/CN2008/073500.

Communication pursuant to Article 94(3) EPC dated May 9, 2011 in connection with European Patent Application No. 08 867 893.3.

Communication pursuant to Article 94(3) EPC dated Nov. 9, 2011 in connection with European Patent Application No. EP 08 867 893.3.

* cited by examiner

GRACEFUL RESTART METHOD OF ROUTER, ROUTER AND COMMUNICATION NETWORK THEREOF

CROSS-REFERENCE TO RELATED APPLICATIONS

The application is a continuation of International Application No. PCT/CN2008/073500, filed on Dec. 12, 2008, which claims priority to Chinese Patent Application No. 200710125062.5, filed on Dec. 13, 2007, both of which are hereby incorporated by reference in their entireties.

TECHNICAL FIELD

The present invention relates to the field of communication technology, and more particularly to a graceful restart (GR) method of a router, and a router and a communication network thereof.

BACKGROUND

The Multi Protocol Label Switching (MPLS) protocol is a special forwarding mechanism, which assigns labels to Internet Protocol (IP) packets accessing a network, and implements the forwarding of the IP packets through label switching. The labels function as substitutes of IP packet headers in the network. In the network, the MPLS forwards the IP packets through the labels (instead of the IP packet headers) in the paths of the IP packets. When the IP packets exit the MPLS network, the packets are decapsulated, and are routed to the destination according to the routing modes of the IP packets.

Referring to FIG. 1, nodes at the edge of the MPLS network are label edge routers (LERs), and nodes at the center of the MPLS network are label switching routers (LSRs). Paths between the nodes in the MPLS network are label switched paths (LSPs). An LSP may be considered as a unidirectional tunnel through the MPLS network. An LSP carries relevant routing and topological information.

The system architecture of the MPLS includes a control plane and a forwarding plane. The control plane is configured to generate a label information base according to an LSP, and transfer control information to a label forwarding information base on the forwarding plane for guiding label forwarding.

In the conventional art, when a router controls a GR, an MPLS forwarding maintenance timer is started. An interval of the timer may be configured by a user. Before the timer expires, the forwarding plane reserves label switching information before the GR is controlled, and the control plane recovers the label information. After the timer expires, the control plane exits the GR state, and in the case that some label information is not recovered, the forwarding plane deletes such information. In addition, if all the label information is recovered before the timer expires, the GR time is not shortened.

During the implementation of the present invention, the inventors find that the conventional art has at least the following problem: The MPLS forwarding maintenance timer is configured to control the time of the GR; however, before the LSRs are recovered and restarted, the time required by all the LSPs is not only related to the number of LSPs, but also closely to the elements such as processing speed, network state, and topological environment. In actual applications, it is possible that the LSPs are not completely recovered after the timer expires, or the LSPs are completely recovered before the timer expires. In the former situation, the routers exit the GR state because the timer expires, while a part of the LSPs are not recovered, thus the unrecovered label information is deleted. This situation results in traffic interruption. In the latter situation, the routers do not exit the GR state after all the LSPs are recovered, thus the recovery time for the routers to recover is affected, and some normal functions of the routers may not be enabled because the routers are in the GR. For example, the routers do not respond to all events such as route changes and configuration changes. Therefore, the situation causes that the timer cannot precisely sense whether all the LSPs are recovered and thus the routers cannot exit a GR state in time after all the LSPs are recovered. As a result, some normal functions of the routers cannot be realized, and the reliability of the routers is lowered.

SUMMARY

Accordingly, the present invention is directed to a GR method of a router, and a router and a communication network thereof, so as to improve reliability of the router.

To solve the above technical problem, in an embodiment, the present invention provides a GR method of a router, which includes the following steps.

When a control plane of the router enters a GR state, LSP packets sent by a neighbor router are received, and the label information of the control plane is recovered according to the LSP packets.

It is determined whether the label information of the control plane is completely recovered; if the label information of the control plane is completely recovered, the control plane exits the GR state and the label information of a forwarding plane is updated according to the recovered label information of the control plane.

To solve the above technical problem, in an embodiment, the present invention provides a GR method of a router, which includes the following steps.

A control plane enters a GR state.

LSP packets sent by a neighbor router are received, and the label information of the control plane is recovered according to the LSP packets.

It is determined whether the label information of the control plane is completely recovered. If the label information of the control plane is completely recovered, the control plane exits the GR state, and the label information of a forwarding plane is updated according to the recovered label information of the control plane.

Accordingly, in an embodiment, the present invention further provides a router. The router includes a label information storage module, a communication module, a control module, a determining module, and a label forwarding information storage module.

The label information storage module is configured to store label information generated by a control plane of the router.

The communication module is configured to receive LSP packets sent by a neighbor router when the control plane enters a GR state.

The control module is configured to recover the label information in the label information storage module according to the LSP packets.

The determining module is configured to determine whether the label information of the control plane is completely recovered, and if the label information of the control plane is completely recovered, notify the control module to enable the control plane to exit the GR state, and forward the label information stored in the label information storage module to the label forwarding information storage module.

Accordingly, in an embodiment, the present invention further provides a communication network, which includes a restart router and a neighbor router that communicates with the restart router. The restart router includes a label information storage module, a communication module, a control module, a determining module, and a label forwarding information storage module.

The label information storage module is configured to store label information generated by a control plane of the restart router.

The communication module is configured to receive LSP packets sent by the neighbor router when the control plane enters a GR state.

The control module is configured to recover the label information in the label information storage module according to the LSP packets.

The determining module is configured to determine whether the label information of the control plane is completely recovered, and if the label information of the control plane is completely recovered, notify the control module to enable the control plane to exit the GR state, and forward the label information stored in the label information storage module to the label forwarding information storage module.

As compared with the conventional art, the GR method of a router and the router and communication network thereof according to the embodiments of the present invention decide whether to exit the GR state by detecting whether the label information of the control plane is completely recovered. Thus, the time of exiting the GR state can be controlled precisely. In this way, once the label information is completely recovered, the router can exit the GR state immediately. This prevents such problem that some normal functions of the router cannot be enabled because recovering the LSPs is asynchronous with exiting the GR state, and thus the reliability of the router is improved.

DETAILED DESCRIPTION

To make the objectives, technical solutions, and beneficial effects of the present invention more understandable, the present invention is described in detail below with reference to the accompanying drawings and implementations. It should be understood that the implementations described herein are only intended to illustrate the present invention, but are not intended to limit the present invention.

The GR technology is briefly described as follows. When a control plane of a router (LER or LSR) is restarted, a forwarding plane retains a label forwarding information base unchanged to ensure uninterrupted label forwarding; after the control plane is recovered, the label forwarding information base of the forwarding plane is updated. This minimizes the influence on adjacent nodes caused by the restart process of any router. Specifically, if the control plane is restarted, the information on a label information base is marked "Stale". The change in the information, however, is not notified to the label forwarding information base of the forwarding plane to ensure that the information on the label forwarding information base remains consistent with the information before the restart of the control plane. After the control plane operates normally, new LSPs are generated, and the label information base and label forwarding information base are updated. If the label information on the label information base is not recovered within a specified period, the label information that is not recovered should be deleted. The GR indicates a special period for recovering the label information after the restart begins. During the GR, to prevent exceptions in the system processing flow, the router does not respond to all events such as route changes and configuration changes. Therefore, the normal functions of the router are affected to some extent.

Figure 1:
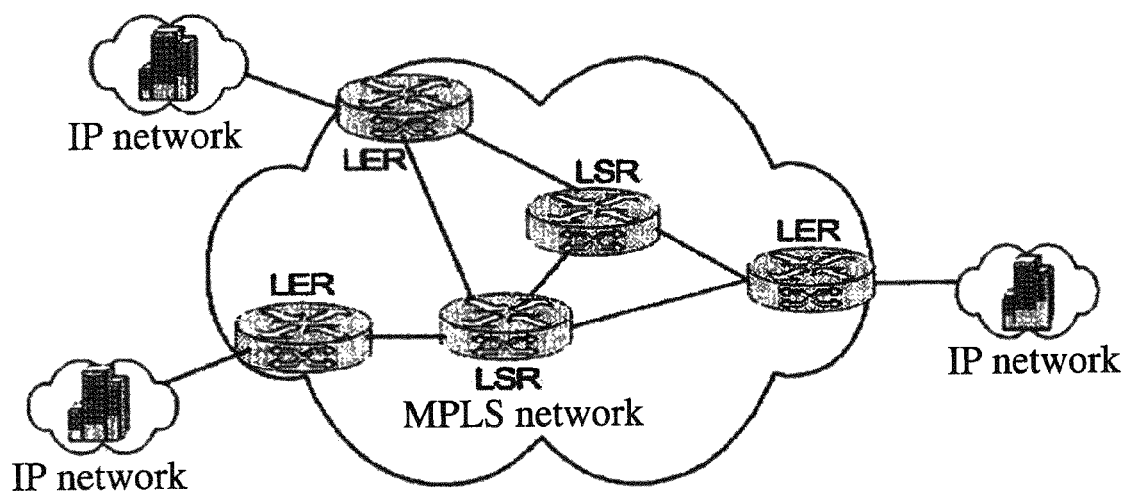
FIG. 1 is a schematic structural view of an MPLS network of the conventional art.
Figure 2:
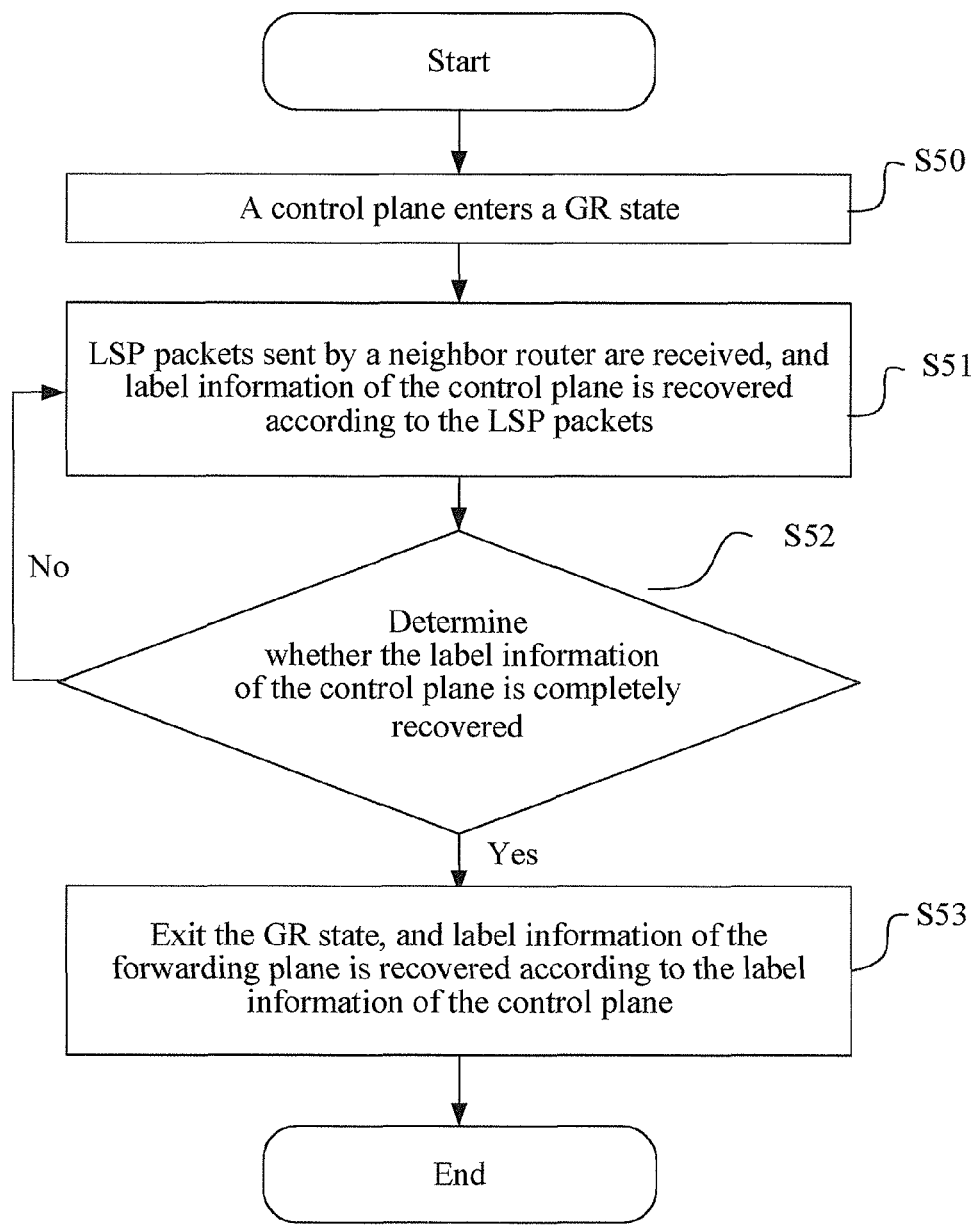
FIG. 2 is a schematic flow chart of a first implementation of a GR method of the present invention.

FIG. 2 is a schematic flow chart of a first implementation of a GR method according to the present invention. In this implementation, it is decided whether to exit the GR state by determining whether the label information of the control plane is completely recovered. The method includes the following steps.

In step S50, the control plane enters a GR state. Specifically, after the control plane enters the GR state, label information on a label information base is marked "Stale". The change in the information, however, is not notified to a label forwarding information base of a forwarding plane to ensure that the label forwarding information base remains consistent with the information before the restart of the control plane. Thus, uninterrupted forwarding can be realized.

In step S51, LSP packets sent by a neighbor router are received, and label information of the control plane is recovered according to the LSP packets. Specifically, the router entering the GR state establishes a session with the neighbor router again, recovers the label information of the control plane after receiving an LSP packet, and deletes the "Stale" mark that is previously added to a piece of label information once the information is recovered.

In step S52, it is determined whether the label information of the control plane is completely recovered. If the label information of the control plane is completely recovered, step S53 is performed. If the label information of the control plane is not completely recovered, the process returns to step S51.

In step S53, the router exits the GR state, and the label information of the forwarding plane is updated according to the recovered label information of the control plane.

In this implementation, it is decided whether to exit the GR state by detecting whether the label information of the control plane is completely recovered. Thus, the time of exiting the GR state can be controlled precisely. In this way, once the label information is completely recovered, the router can exit the GR state immediately. This prevents such problem that some normal functions of the router cannot be enabled because recovering the LSPs is asynchronous with exiting the GR state, and thus the reliability of the router is improved.

Figure 3:
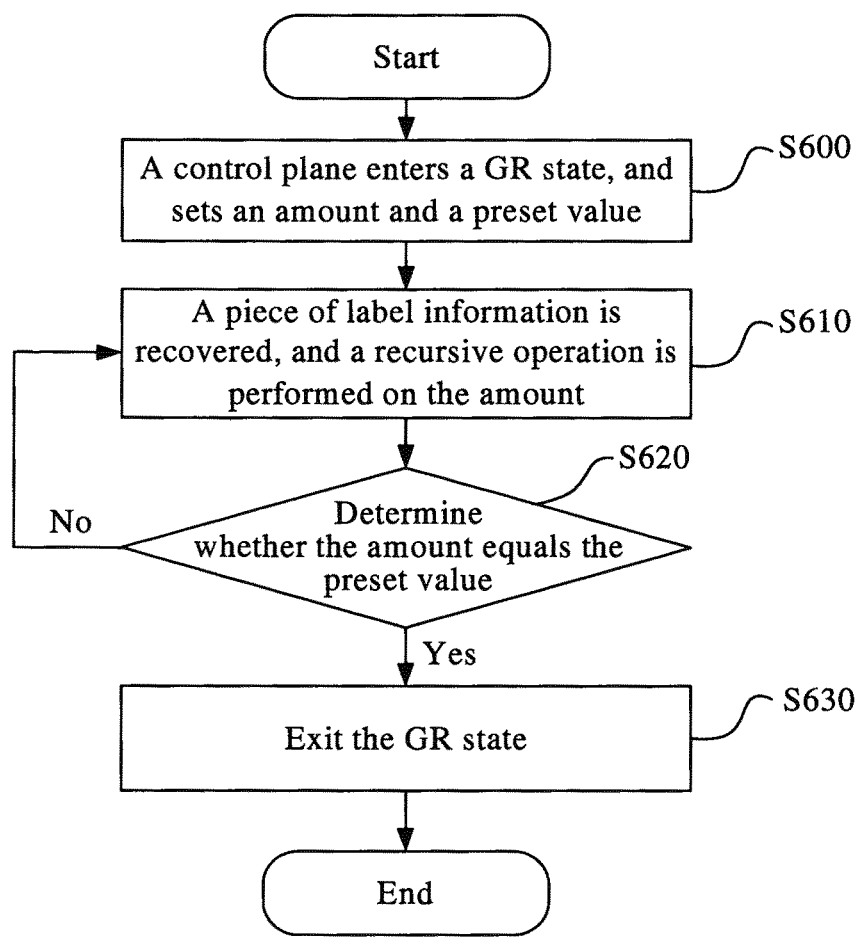
FIG. 3 is a schematic flow chart of a second implementation of a GR method of the present invention.

FIG. 3 is a schematic flow chart of a second implementation of a GR method of the present invention. Referring to FIG. 3, in this implementation, it is determined whether the label information of the control plane is completely recovered according to whether an amount of label information of the control plane reaches a preset value. The method includes the following steps.

In step S600, the control plane enters the GR state, and sets an amount of label information of the control plane and a preset value. The amount and the preset value are set according to the following rules. It is assumed that a total of n pieces of label information (n is a positive integer) exists before the GR, and a value of the amount equals the preset value after n recursive operations (that is, increment or decrement operations). For example, an initial value of the amount may be set to zero or the total amount of label information before the GR. The total amount of label information before the GR is obtained when the control plane establishes LSPs. Specifically, each time the control plane establishes an LSP, the amount whose initial value is zero is added by one. Thus, even if the control plane is restarted abnormally, the total amount of label information before the restart can be reserved. If the initial value of the amount is set to zero, the preset value is set to the total amount of label information before the GR, and the amount after n recursive operations (that is, added by one) equals the preset value; if the initial value of the amount is set to the total amount of label information before the GR, the preset value is set to zero, and the amount after n recursive operations (that is, subtracting one from the amount) equals the preset value.

In step S610, a piece of label information is recovered, and a recursive operation (that is, increment or decrement operation) is performed according to the amount. Specifically, if the initial value of the amount is set to zero in step S600, an increment operation is performed when a piece of label information is recovered in step S610; if the initial value of the amount is set to the total amount of label information before the GR, an decrement operation is performed when a piece of label information is recovered in step S610.

In step S620, it is determined whether the amount equals the preset value. If the amount equals the preset value, step S630 is performed. If the amount does not equal the preset value, the process returns to step S610.

In step S630, the router exits the GR state, and the label information of the forwarding plane is updated according to the recovered label information of the control plane.

The following describes the two specific embodiments of the second implementation of the GR method of the present invention in detail.

Figure 4:
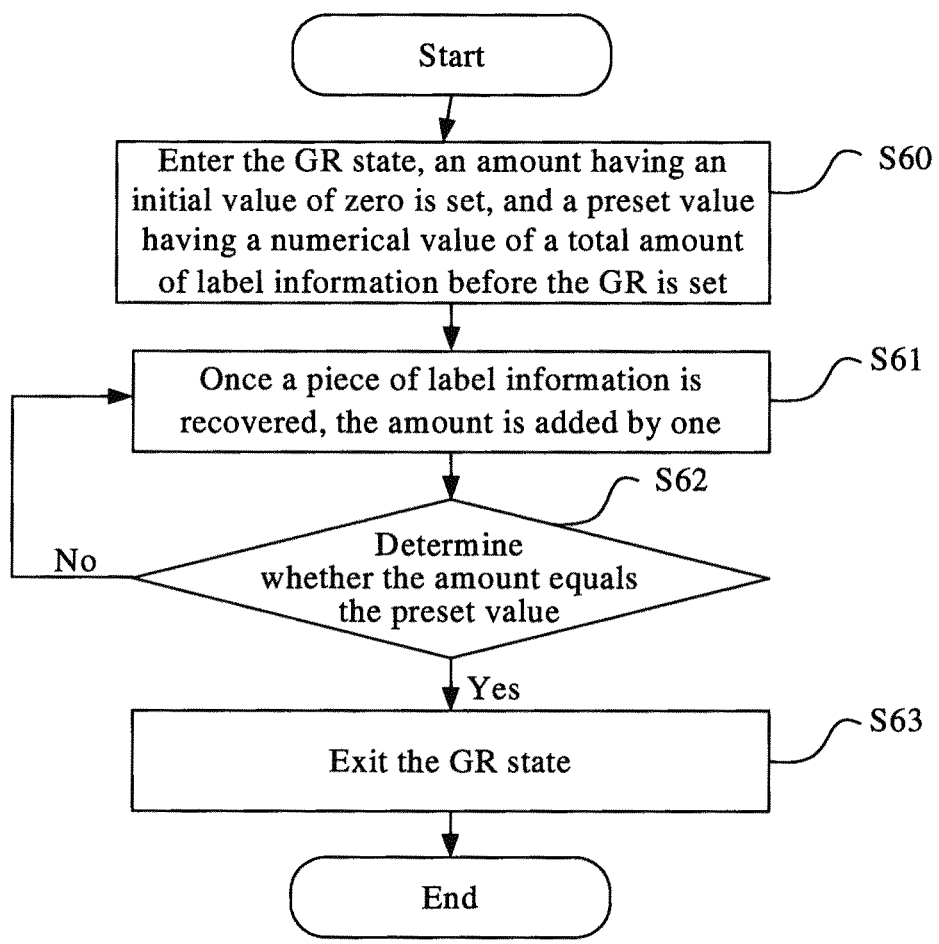
FIG. 4 is a schematic flow chart of an embodiment of FIG. 3.

FIG. 4 is a schematic flowchart of an embodiment of the second implementation of the GR method of the present invention. Referring to FIG. 4, the method includes the following steps.

In step S60, the control plane enters the GR state, an amount is set to an initial value of zero, and a preset value is set to a numerical value of a total amount of label information before the GR is set. The preset value is the total amount of label information before the GR.

In step S61, once a piece of label information is recovered, the amount is added by one.

In step S62, it is determined whether the amount equals the preset value, that is, whether the amount of recovered label information reaches the total amount of the label information before the GR. If the amount of recovered label information reaches the total amount of the label information before the GR, step S63 is performed; if the amount of recovered label information does not reach the total amount of the label information before the GR, step S61 is performed.

In step S63, the router exits the GR state.

Figure 5:
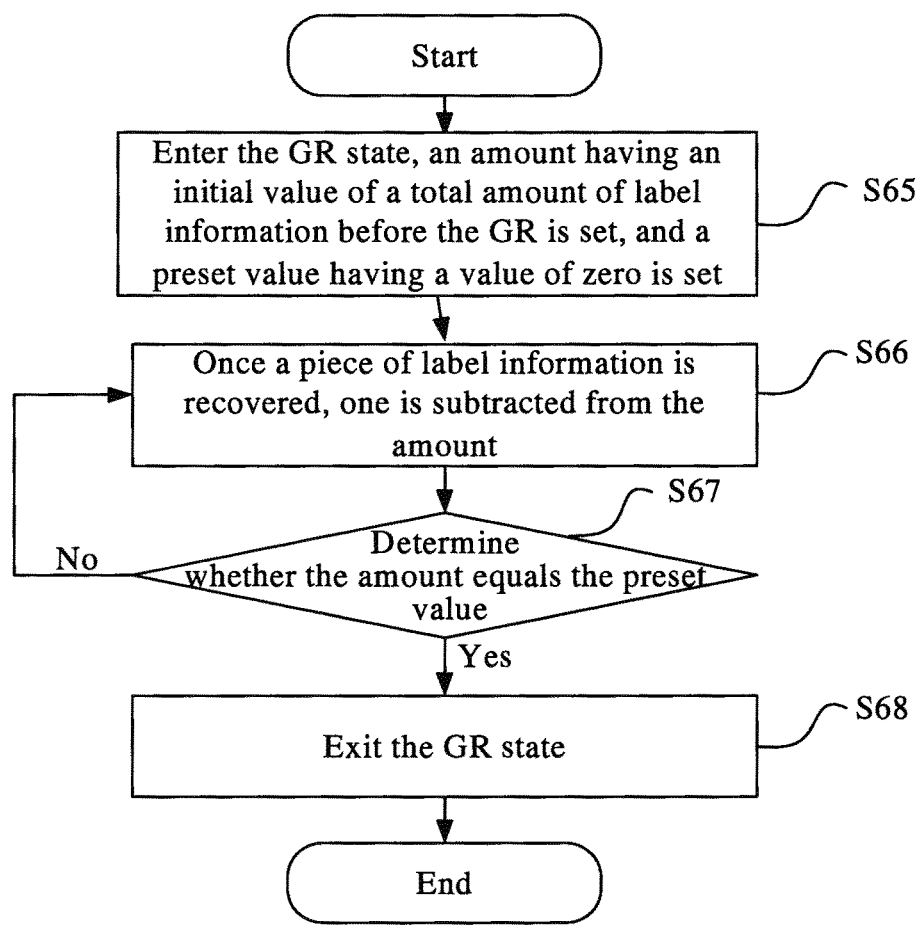
FIG. 5 is a schematic flowchart of another embodiment of FIG. 3.

FIG. 5 is a schematic flow chart of another embodiment of the second implementation of the GR method of the present invention. Referring to FIG. 5, the method includes the following steps.

In step S65, the control plane enters the GR state, an amount of label information is set to an initial value of a total amount of label information before the GR is set, and a preset value is set to a numerical value of zero.

In step S66, once a piece of label information is recovered, one is subtracted from the amount.

In step S67, it is determined whether the amount equals the preset value, that is, whether the amount of recovered label information reaches the total amount of label information before the GR. If the amount of recovered label information reaches the total amount of label information before the GR, step S68 is performed. If the amount of recovered label information does not reach the total amount of label information before the GR, step S66 is performed.

In step S68, the router exits the GR state.

In this implementation, it is decided whether to exit the GR state by detecting whether the amount of recovered label information of the control plane reaches the preset value. Once the amount of the recovered label information reaches the preset value, it indicates that the label information is completely recovered, and the router can exit the GR state immediately. Thus, the time of exiting the GR state can be controlled precisely. In addition, this prevents such problem that some normal functions of the router cannot be enabled because recovering the LSPs is asynchronous with exiting the GR state, and thus the reliability of the router is improved.

Figure 6:
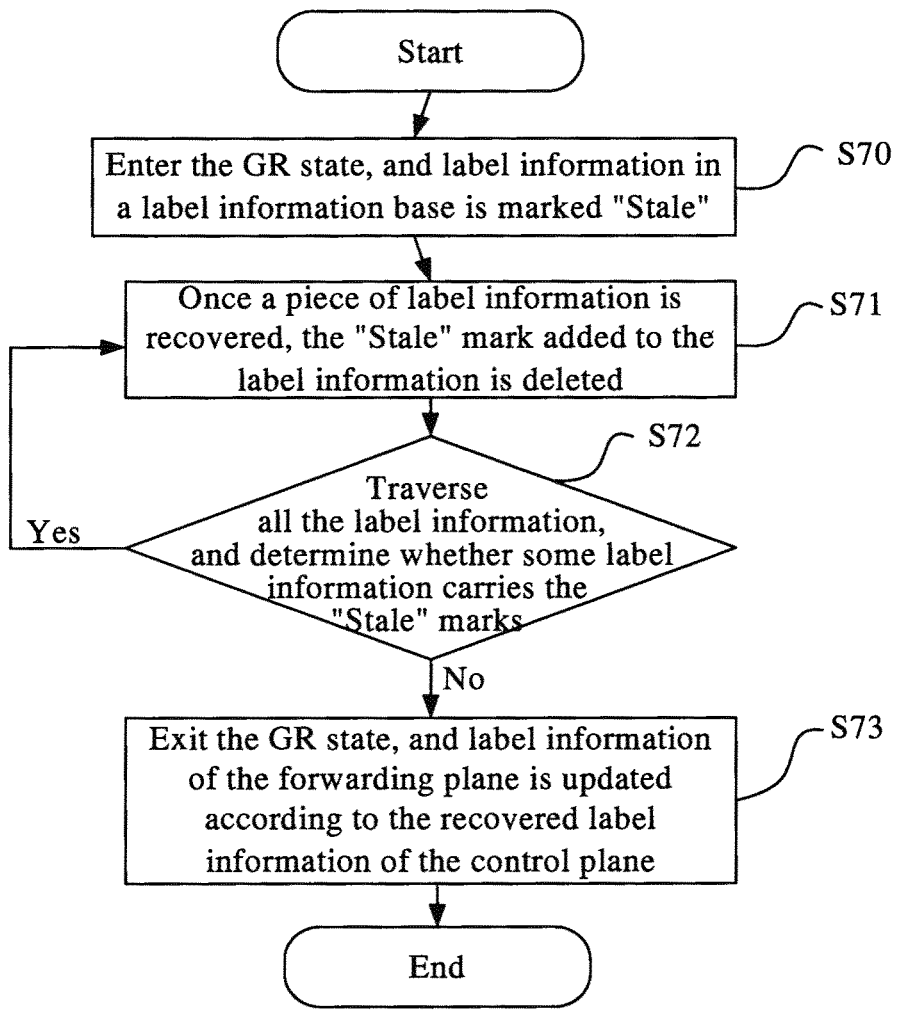
FIG. 6 is a schematic flow chart of a third implementation of a GR method of the present invention.

FIG. 6 is a schematic flow chart of a third implementation of a GR method of the present invention. Referring to FIG. 6, in this implementation, it is determined whether the label information of the control plane is completely recovered by traversing all the label information, and determining whether some of the label information carries aging marks. The aging mark indicates that the corresponding label should have been abandoned, but is still guiding the forwarding. In this implementation, a "Stale" mark is taken as an example of the aging mark. The method includes the following steps.

In step S70, the control plane enters the GR state, and label information in a label information base is marked "Stale".

In step S71, once a piece of label information is recovered, the "Stale" mark added to the label information is deleted.

In step S72, the label information in the label information base is traversed, and it is determined whether some label information carries "Stale" marks. If some label information does not carry "Stale" marks, it indicates that the label information is completely recovered, and step S73 is performed. If some label information carries "Stale" marks, the process returns to step S71.

In step S73, the router exits the GR state, and the label information of the forwarding plane is updated according to the recovered label information of the control plane.

In this implementation, it is decided whether to exit the GR state by traversing all the label information and determining whether some label information carries aging marks. If no label information carries a aging mark, it indicates that the label information is completely recovered, and the router can exit the GR state immediately. Thus, the time of exiting the GR state can be controlled precisely. In addition, this prevents such problem that some normal functions of the router cannot be enabled because recovering the LSPs is asynchronous with exiting the GR state, and thus the reliability of the router is improved.

Figure 7:
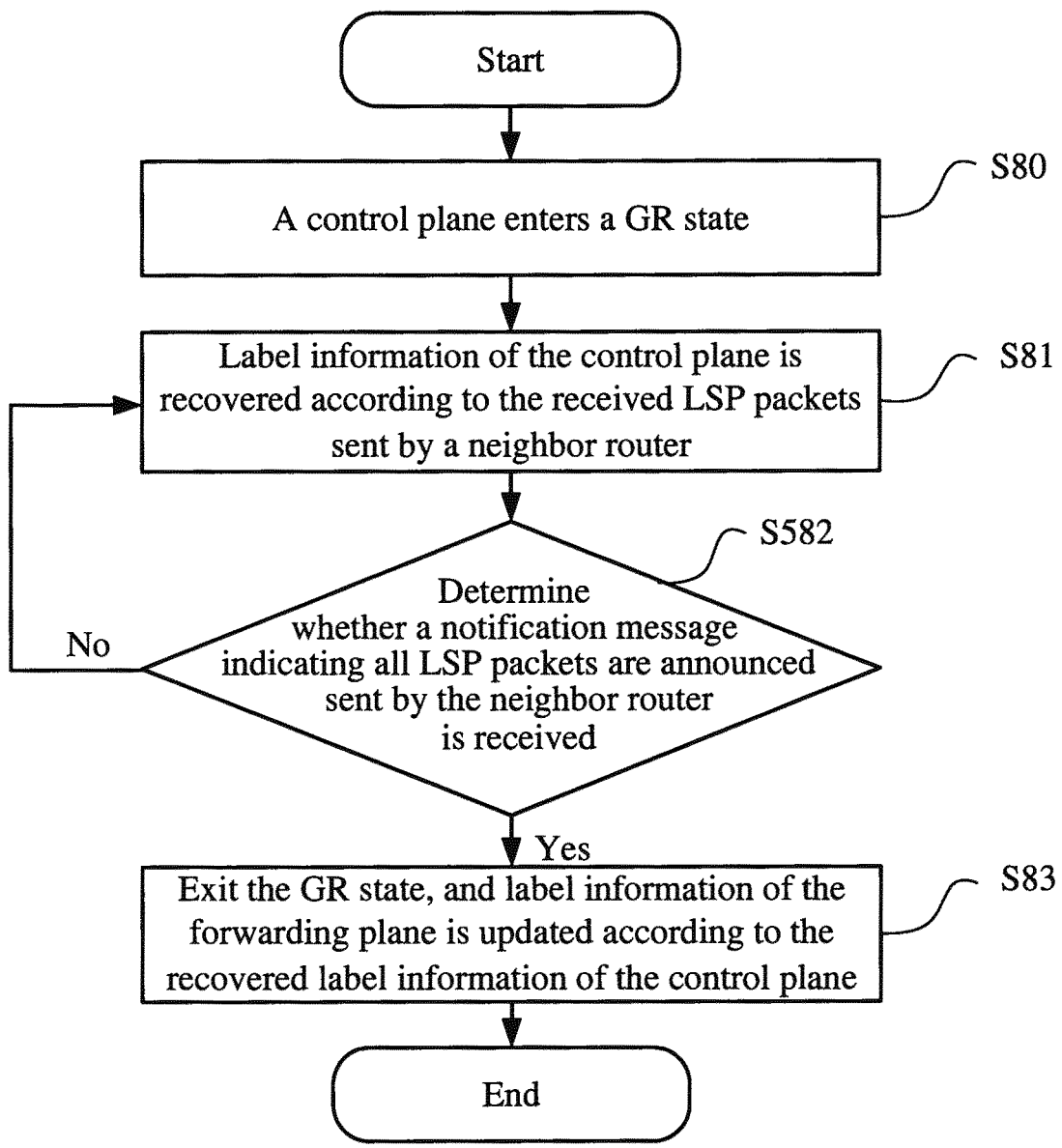
FIG. 7 is a schematic flow chart of a fourth implementation of a GR method of the present invention.

FIG. 7 is a schematic flow chart of a fourth implementation of a GR method of the present invention. Referring to FIG. 7, in this implementation, it is determined whether the label information of the control plane is completely recovered by determining whether a notification message is received. The notification message, which is sent by a neighbor router, indicates that all LSP packets are announced.

In step S80, the control plane enters a GR state. Specifically, after the control plane enters the GR state, label information in a label information base is marked "Stale". The change in the information, however, is not notified to a label forwarding information base of a forwarding plane to ensure that the information on the label forwarding information base remains consistent with the information before the restart of the control plane.

In step S81, the label information of the control plane is recovered according to the LSP packets. Specifically, the router entering the GR state establishes a session with the neighbor router again, recovers the label information of the control information after receiving an LSP packet, and deletes the "Stale" mark added to a piece of label information once the information is recovered.

In step S82, it is determined whether a notification message, which is sent by the neighbor router and indicates that all LSP packets are announced, is received. If the notification message is received, it indicates that the label information is completely recovered, and step S83 is performed. If the notification message is not received, the process returns to step S81.

In step S83, the router exits the GR state, and the label information of the forwarding plane is updated according to the recovered label information of the control plane.

In this implementation, it is decided whether to exit the GR state by determining whether the notification message, which is sent by the neighbor router and indicates that all LSP packets are announced, is received. Once the notification message is received, it indicates that the label information is completely recovered, and the router can exit the GR state immediately. Thus, the time of exiting the GR can be controlled precisely. In addition, this prevents such problem that some normal functions of the router cannot be enabled because recovering the LSPs is asynchronous with exiting the GR state, and thus the reliability of the router is improved.

Figure 8:
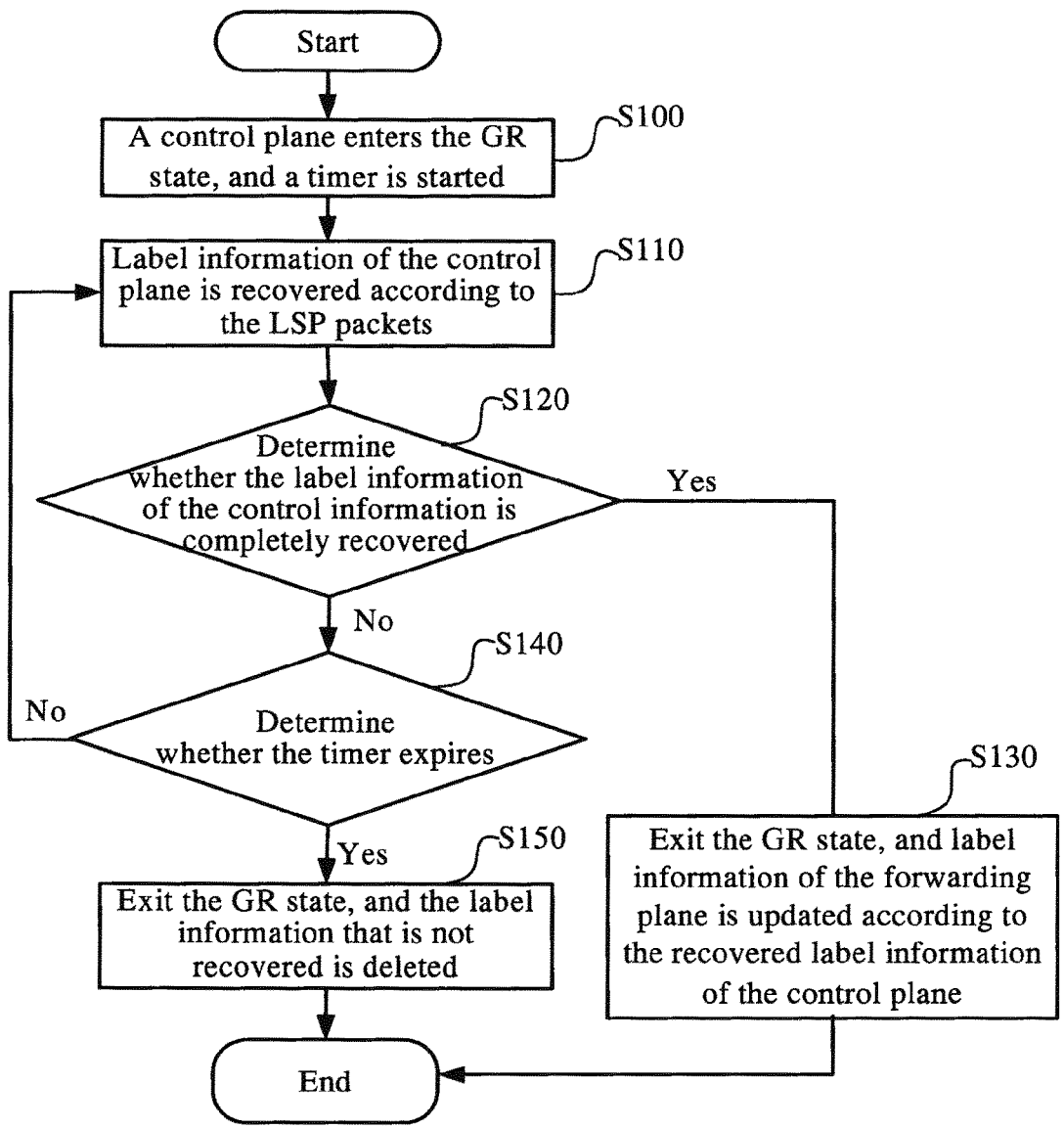
FIG. 8 is a schematic flow chart of a fifth implementation of a GR method of the present invention.

FIG. 8 is a schematic flow chart of a fifth implementation of a GR method of the present invention. Referring to FIG. 8, in this implementation, it is decided whether to exit the GR state by determining whether the label information of the control plane is completely recovered and whether the timer expires. The method includes the following steps.

In step S100, the control plane enters the GR state, and a timer is started at the same time. Specifically, after the control plane enters a GR state, label information on a label information base is marked "Stale". The change in the information, however, is not notified to a label forwarding information base of a forwarding plane to ensure that the information on the label forwarding information base remains consistent with the information before the restart of the control plane. Meanwhile, an MPLS forwarding maintenance timer is started. The time of the timer can be set flexibly. For example, if the router does not limit the GR time strictly, the time of the timer may be set to slightly longer than normal GR timer of the router, such that the router can exit the GR state after all label information is recovered; if the router limits the GR time strictly, and cannot endure a long-time recovery, the time of the timer can be set according to actual requirements.

In step S110, LSP packets sent by a neighbor router are received, and label information of the control plane is recovered according to the LSP packets. Specifically, the router entering the GR state establishes a session with the neighbor router again, recovers the label information (that is, LSP packet) of the control information after receiving an LSP packet, and deletes the "Stale" mark added to a piece of label information once the information is recovered.

In step S120, it is determined whether the label information of the control information is completely recovered. If the label information of the control information is completely recovered, step. S130 is performed. If the label information of the control information is not completely recovered, the process returns to step S140. Specifically, it is determined whether the label information of the control plane is completely recovered according to one of the second implementation, the third implementation, or the fourth implementation of the GR method of the present invention.

In step S130, the router exits the GR state, and the label information of the forwarding plane is updated according to the recovered label information of the control plane.

In step S140, it is determined whether the timer expires. If the timer expires, step S150 is performed. If the timer does not expire, the process returns to step S110.

In step S150, the router exits the GR state, and the label information that is not recovered is deleted. The router exits the GR state because the timer expires, and thus the label information that is not recovered needs to be deleted.

In this implementation, it is decided whether to exit the GR state by determining whether the label information of the control plane is completely recovered and whether the timer expires. Once the label information is completely recovered, the router can exit the GR state immediately. Thus, the time of exiting the GR state can be controlled precisely. In addition, this prevents such problem that some normal functions of the router cannot be enabled because recovering the LSPs is asynchronous with exiting the GR state, and thus the reliability of the router is improved. If the label information is not completely recovered, for example, because the'LSPs are not completely recovered due to faults of the router, it may be decided whether to exit the GR state by determining whether the timer expires. If the timer expires, the router exits the GR state. This prevents the problem that the router cannot exit the GR state because some label information cannot be recovered.

Persons of ordinary skill in the art can understand from the method embodiments described above that instead of a necessary step of solving the problem of the conventional art, the control plane entering the GR state may also be a prerequisite for implementing the method according to the embodiments of the present invention. Therefore, the method according to the embodiments of the present invention may further include the following. When the control plane of the router enters the GR state, LSP packets sent by a neighbor router are received, and the label information of the control plane is recovered according to the LSP packets. It is determined whether the label information of the control plane is completely recovered. If the label information of the control plane is completely recovered, the GR state is exited, and the label information of the forwarding plane is updated according to the recovered label information of the control plane. The process and manner for implementing the steps may be those steps described in the second, third, or fourth embodiment.

Persons of ordinary skill in the art can understand that all of or a part of the steps in the method according to the previous embodiments may be completed by relevant hardware through instructions from a program. The program may be stored in a computer readable storage medium, for example, a ROM/RAM, a magnetic disk, or an optical disk.

The program includes the following steps in execution.

A control plane enters a GR state, LSP packets sent by a neighbor router are received, and label information of the control plane is recovered according to the LSP packets.

Whether the label information of the control plane is completely recovered is determined. If the label information of the control plane is completely recovered, the GR state is exited, and label information of a forwarding plane is updated according to the recovered label information of the control plane.

In addition, the control plane entering the GR state may also be the prerequisite for implementing the method according to the embodiments of the present invention, but is not a necessary step when the program is executed. Therefore, according to the embodiments of the present invention, the program may also include the following steps in execution.

When a control plane of a router enters a GR state, LSP packets sent by a neighbor router are received, and label information of the control plane is recovered according to the LSP packets.

Whether the label information of the control plane is completely recovered is determined. If the label information of the control plane is completely recovered, the GR state is exited, and label information of a forwarding plane is updated according to the recovered label information of the control plane.

Figure 9:
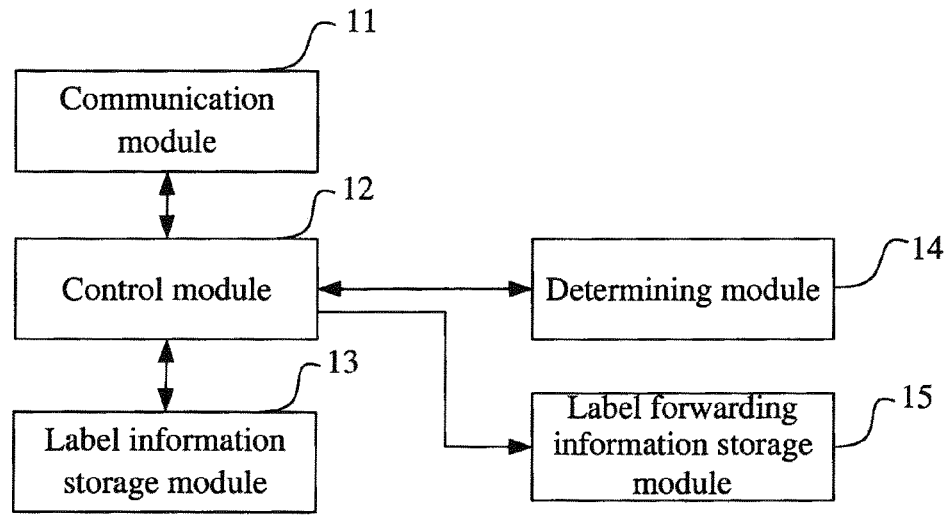
FIG. 9 is a schematic structural view of a first implementation of a router of the present invention.

FIG. 9 is a schematic structural view of a first implementation of a router of the present invention. Referring to FIG. 9, the router includes a communication module 11, a control module 12, a label information storage module 13, a label forwarding information storage module 15, and a determining module 14. The label information storage module 13 is configured to store label information generated by a control plane of the router. The control module 12 is configured to forward the label information stored in the label information storage module 13 to the label forwarding information storage module 15. The router guides label forwarding according to the label information in the label forwarding information storage module 15.

The control module 12 is configured to start a GR function after the router is faulty or after receiving other information indicating that the router needs to be restarted, and enable the control plane to enter a GR state. The control module 12 is further configured to add "Stale" marks to the label information in the label information storage module 13.

The communication module 11 is configured to receive LSP packets sent by a neighbor router when the control plane enters the GR state. The control module 12 is further configured to recover the label information of the control plane according to the LSP packets, write the recovered label information in the label information storage module 13, and delete the added "Stale" mark once a piece of the label information is recovered.

The determining module 14 is started after the control module 12 enables the control plane to enter the GR state, and is configured to determine whether the label information in the label information storage module 13 is completely recovered; if the label information in the label information storage module 13 is completely recovered, the determining module 14 is configured to notify the control module 12 to enable the control plane to exit the GR state, and the control plane 12 forwards the label information stored in the label information storage module 13 to the label forwarding information storage module 15; if the label information in the label information storage module 13 is not completely recovered, the determining module 14 is configured to notify the control module 12 to continue recovering the label information.

In this implementation, the determining module 14 detects whether the label information in the label information storage module 14 is completely recovered, so as to decide whether to exit the GR state. Thus, the time of exiting the GR state can be controlled precisely. In this way, once the label information is completely recovered, the router can exit the GR state immediately. This prevents such problem that some normal functions of the router cannot be enabled because recovering the LSPs is asynchronous with exiting the GR state, and thus the reliability of the router is improved.

Figure 10:
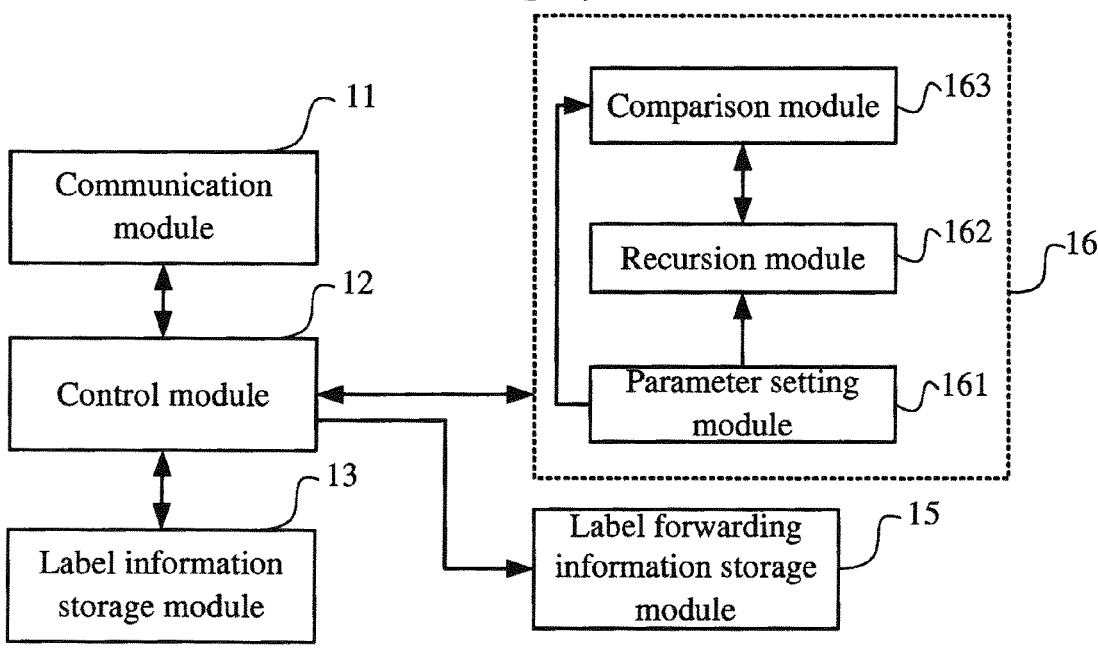
FIG. 10 is a schematic structural view of a second implementation of a router of the present invention.

FIG. 10 is a schematic structural view of a second implementation of a router of the present invention. Referring to FIG. 10, the router includes a communication module 11, a control module 12, a label information storage module 13, a label forwarding information storage module 15, and a determining module 16. In this implementation, the determining module 16 determines whether label information of a control plane is completely recovered according to whether an amount reaches a preset value. The determining module 16 includes a parameter setting module 161, a recursion module 162, and a comparison module 163.

The control module 12 is configured to start a GR function after the router is faulty or after receiving other information indicating that the router needs to be restarted, and enable the control plane to enter a GR state. The control module 12 is further configured to add "Stale" marks to the label information in the label information storage module 13.

The determining module 16 is started after the control module 12 enables the control plane to enter the GR state. The parameter setting module 161 is configured to set an amount and a preset value. The amount and the preset value are set in light of the following rules. It is assumed that a total of n pieces of label information (n is a positive integer) exists before the GR, and a value of the amount equals the preset value after n recursive operations (that is, increment or decrement operations). For example, an initial value of the amount may be set to zero or the total amount of label information before the GR. If the initial value of the amount is set to zero, the preset value is set to the total amount of the label information before the GR, and the amount after n recursive operations (added by one) equals the preset value; if the initial value of the amount is set to the total amount of the label information before the GR, the preset value is set to zero, and the amount after n recursive operations (subtracting one from the amount) equals the preset value.

The communication module 11 is configured to receive LSP packets sent by a neighbor router when the control plane enters the GR state. The control module 12 is configured to recover the label information of the control plane according to the LSP packets, write the recovered label information in the label information storage module 13, and delete the added "Stale" marks. Once a piece of label information is recovered, the control module 12 controls the recursion module 162 to perform a recursive operation (for example, increment or decrement). Specifically, if the initial value of the amount is set to zero, the increment operation is performed when a piece of label information is recovered; if the initial value of the amount is set to the total amount of the label information before the GR, the decrement operation is performed when a piece of label information is recovered.

The comparison module 163 is connected to the parameter setting module 161 and the recursion module 162, and is configured to receive the preset value set by the parameter setting module 161 and the amount after the recursive operations of the recursion module 162, and determine whether the amount equals the preset value. If the amount equals the preset value, it indicates that the label information in the label information storage module 13 is completely recovered, so the comparison module 163 notifies the control module 12 to enable the control plane to exit the GR state, and the control module 12 forwards the label information stored in the label information storage module 13 to the label forwarding information storage module 15; if the amount does not equal the preset value, the comparison module 163 notifies the control module 12 to continue recovering the label information.

Figure 11:
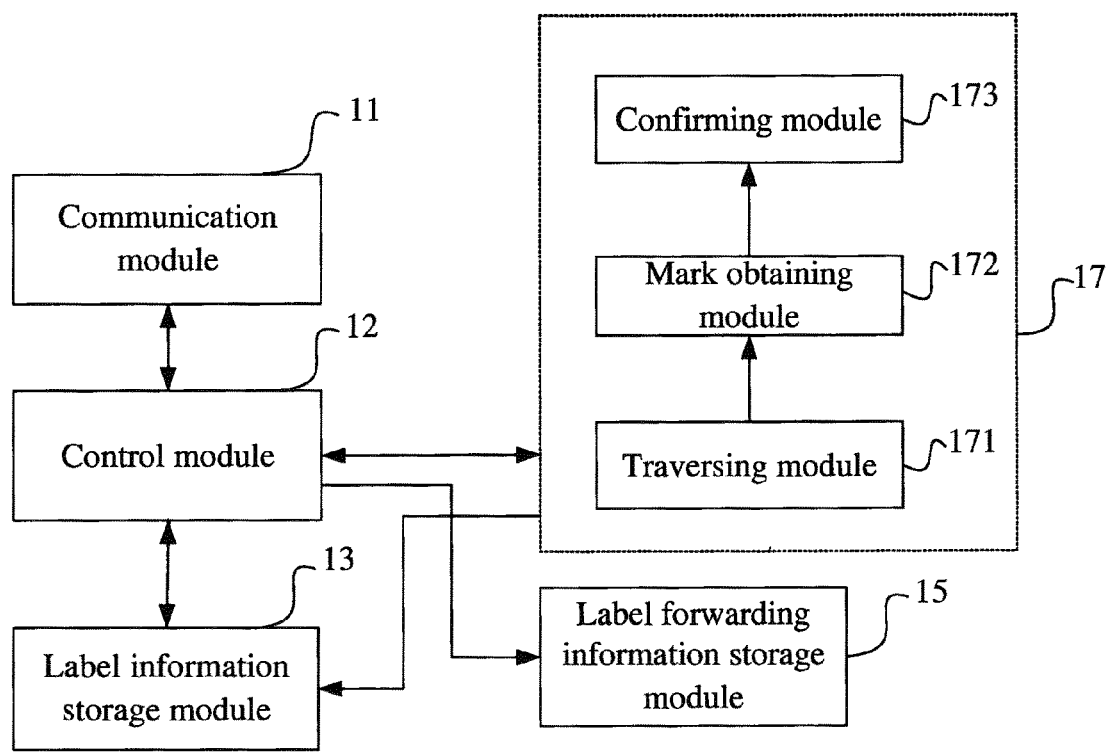
FIG. 11 is a schematic structural view of a third implementation of a router of the present invention.

FIG. 11 is a schematic structural view of a third implementation of a router of the present invention. Referring to FIG. 11, the router includes a communication module 11, a control module 12, a label information storage module 13, a label forwarding information storage module 15, and a determining module 17. In this embodiment, the determining module 17 determines whether label information of a control plane is completely recovered by traversing label information in the label information storage module 13 and determining whether some label information carries aging marks. The determining module 17 includes a traversing module 171, a mark obtaining module 172, and a confirming module 173.

The control module 12 is configured to start a GR function after the router is faulty or after receiving other information indicating that the router needs to be restarted, and enable the control plane to enter a GR state. The control module 12 is further configured to add aging marks to the label information in the label information storage module 13. In this implementation, the "Stale" marks are taken for example.

The determining module 17 is started after the control module 12 enables the control plane to enter the GR state.

The communication module 11 is configured to receive LSP packets sent by a neighbor router when the control plane enters the GR state. The control module 12 is further configured to recover the label information of the control plane according to the LSP packets, write the recovered label information in the label information storage module 13, and delete the added "Stale" marks. Once a piece of label information is recovered, the control module 12 controls the traversing module to traverse the label information in the label information storage module 13 for once.

The mark obtaining module 172 is configured to obtain the aging marks "Stale" when the traversing module 171 traverses the label information. If the mark obtaining module 172 does not obtain any "Stale" mark, it indicates that the label information in the label information storage module 13 is completely recovered, so the confirming module 173 notifies the control module 12 to enable the control plane to exit the GR state, and the control module 12 forwards the label information stored in the label information storage module 13 to the label forwarding information storage module 15. If the mark obtaining module 172 obtains the "Stale" marks, it indicates that some information in the label information storage module 13 is still not recovered, so the confirming module 173 notifies the control module 12 to continue recovering the label information.

Figure 12:
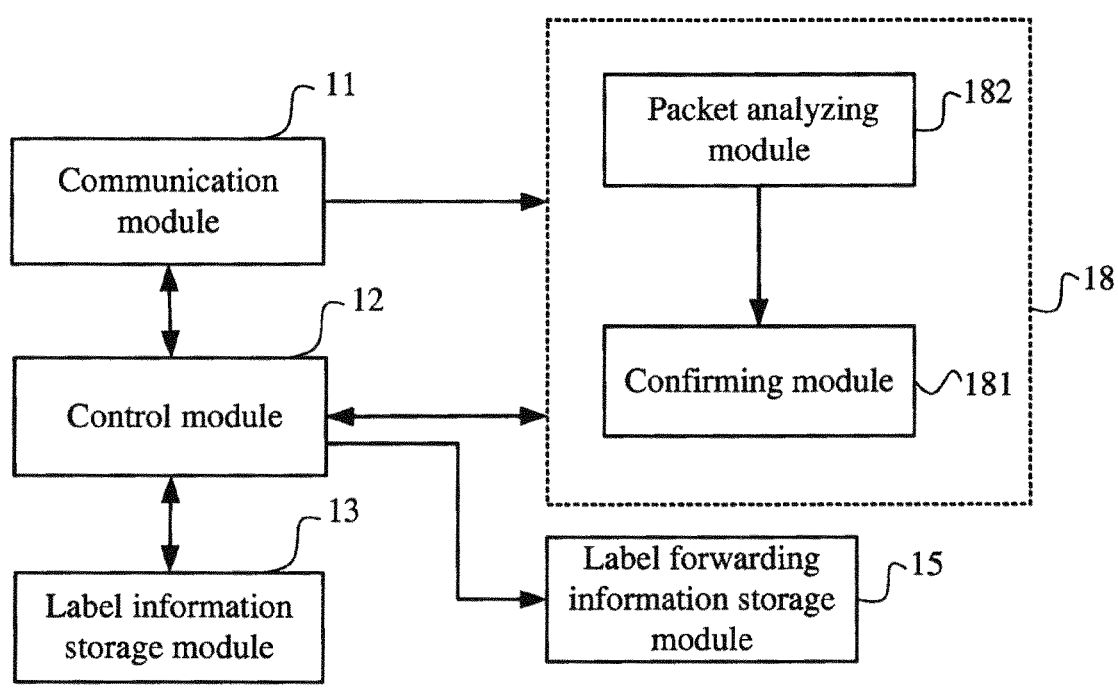
FIG. 12 is a schematic structural view of a fourth implementation of a router of the present invention.

FIG. 12 is a schematic structural view of a fourth implementation of a router of the present invention. Referring to FIG. 12, the router includes a communication module 11, a control module 12, a label information storage module 13, a label forwarding information storage module 15, and a determining module 18. In this implementation, the determining module 18 determines whether label information of a control plane is completely recovered by determining whether the communication module 11 receives a notification message that is sent by a neighbor router and indicates all LSP packets are announced. The determining module 18 includes a packet analyzing module 181 and a confirming module 182.

The control module 12 is configured to start a GR function after the router is faulty or after receiving other information indicating that the router needs to be restarted, and enable the control plane to enter a GR state. The control module 12 is further configured to add "Stale" marks to the label information in the label information storage module 13.

The determining module 17 is started after the control module 12 enables the control plane to enter the GR state.

The communication module 11 is configured to receive LSP packets sent by a neighbor router when the control plane enters the GR state. The control module 12 is configured to recover the label information of the control plane according to the LSP packets, write the recovered label information in the label information storage module 13, and delete the added "Stale" marks.

The packet analyzing module 181 is configured to analyze packets received by the communication module 11, and determine whether a notification message, which is sent by a neighbor router and indicates all LSP packets are announced, is received. The notification message is an end-of-lib (end of label information base) message in the Label Distribution Protocol (LDP). If the notification message is received, the confirming module 182 confirms that the label information in the label information storage module 13 is completely recovered, and notifies the control module to enable the control plane to exit the GR state, and the control module 12 forwards the label information stored in the label information storage module 13 to the label forwarding information storage module 15; if the notification message is not received, the confirming module 182 confirms that the label information in the label information storage module 13 is not completely recovered, and notifies the control module 12 to continue recovering the label information.

In this implementation, it is decided whether to exit the GR state by detecting whether the label information of the control plane is completely recovered. Thus, the time of exiting the GR state can be controlled precisely. In this way, once the label information is completely recovered, the router can exit the GR state immediately. This prevents such problem that some normal functions of the router cannot be enabled because recovering the LSPs is asynchronous with exiting the GR state, and thus the reliability of the router is improved.

Figure 13:
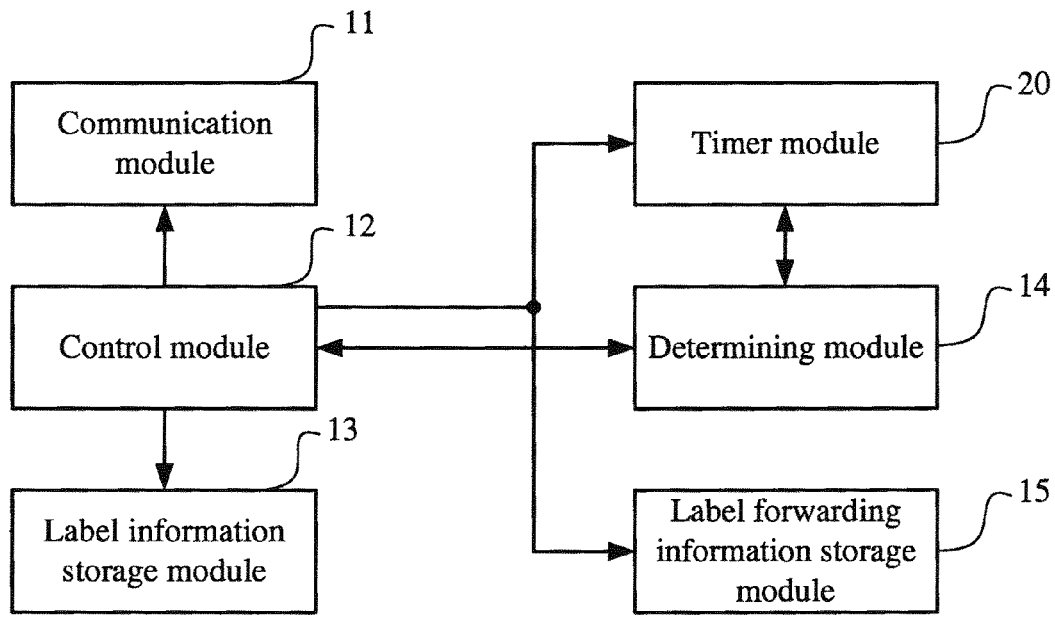
FIG. 13 is a schematic structural view of a fifth implementation of a router of the present invention.

FIG. 13 is a schematic structural view of a fifth implementation of a router of the present invention. Referring to FIG. 13, the router includes a communication module 11, a control module 12, a label information storage module 13, a determining module 14, a label forwarding information storage module 15, and a timer module 20. In this embodiment, the determining module 14 determines whether label information in the label information storage module 13 is completely recovered and whether the timer module 20 expires to decide whether to exit the GR state.

The control module 12 is configured to start a GR function after the router is faulty or after receiving other information indicating that the router needs to be restarted, and enable the control plane to enter a GR state. The control module 12 is further configured to add "Stale" marks to the label information in the label information storage module 13, and start the determining module 14 and a timer of the timer module 20. Thus, the timer starts timing.

The communication module 11 is configured to receive LSP packets sent by a neighbor router when the control plane enters the GR state. The control module 12 is configured to recover the label information of the control plane according to the LSP packets, write the recovered label information in the label information storage module 13, and delete the added "Stale" mark once apiece of the label information is recovered.

The determining module 14 is configured to determine whether the label information in the label information storage module 13 is completely recovered. If the determination result is yes, the determining module 14 notifies the control module 12 to enable the control module to exit the GR state, and the control module 12 forwards the label information stored in the label information storage module 13 to the label forwarding information storage module 15. Specifically, the determining module 14 may be one of the second implementation, the third implementation, or the fourth implementation of the router of the present invention. If the determination result is no, it is then determined whether the timer module 20 expires; if the timer module 20 expires, the determining module 14 notifies the control module 12 to enable the control module to exit the GR state, and the label information that is not recovered is deleted; if the timer module 20 does not expire, the determining module 14 notifies the control module 12 to continue recovering the label information.

In this implementation, the determining module 14 determines whether the label information in the label information storage module 13 is completely recovered and whether the timer module 20 expires, so as to decide whether to exit the GR state. If the label information is completely recovered, the router can exit the GR state immediately. Thus, the time of exiting the GR state can be controlled precisely. In addition, this prevents such problem that some normal functions of the router cannot be enabled because recovering the LSPs is asynchronous with exiting the GR state, and thus the reliability of the router is improved. If the label information is not completely recovered, for example, because the LSPs are not completely recovered due to faults of the router, it may be decided whether to exit the GR state by determining whether the timer module 20 expires. If the timer expires, the router exits the GR state. This prevents the problem that the router cannot exit the GR state because some label information cannot be recovered.

Figure 14:
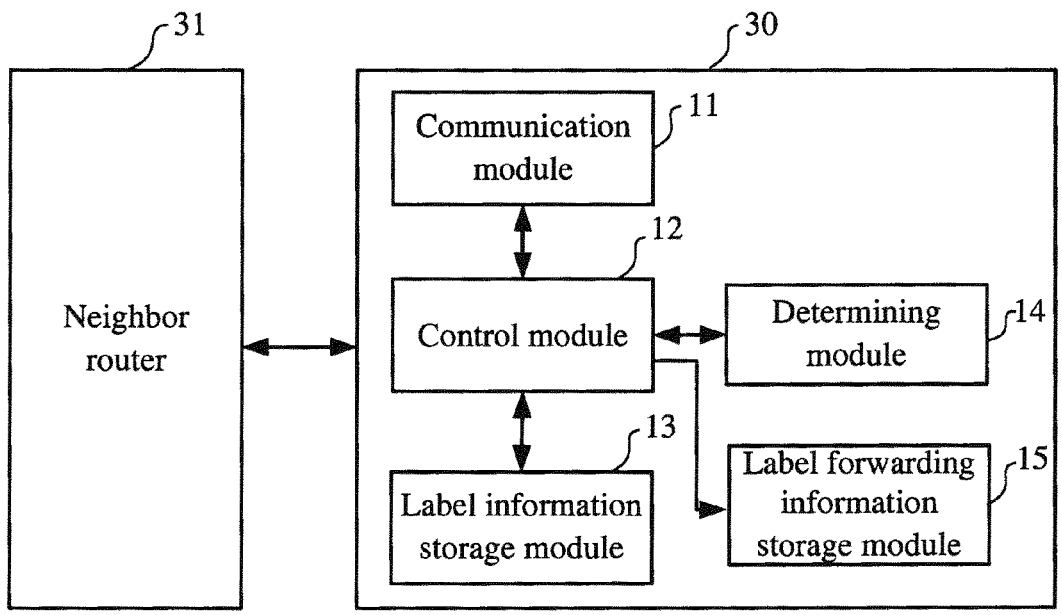
FIG. 14 is a schematic structural view of a first implementation of a communication network of the present invention.

FIG. 14 is a schematic structural view of a first implementation of a communication network of the present invention. Referring to FIG. 14, the communication network includes a restart router 30 and at least one neighbor router 31 connected to the restart router 30 (in this implementation, one neighbor router is taken for example in the illustration). The restart router 30 communicates with the at least one neighbor router 31.

The restart router 30 has the same structure as the first implementation of the router of the preset invention, and includes a communication module 11, a control module 12, a label information storage module 13, a label forwarding information storage module 15, and a determining module 14. The label information storage module 13 is configured to store label information generated by a control plane of the restart router 30. The control module 12 is configured to forward the label information stored in the label information storage module 13 to the label forwarding information storage module 15. The router guides label forwarding according to the label information in the label forwarding information storage module 15.

The control module 12 is configured to start a GR function after the router is faulty or after receiving other information indicating that the router needs to be restarted, and enable the control plane to enter a GR state. The control module 12 is further configured to add "Stale" marks to the label information in the label information storage module 13, and control the communication module 11 to send a notification message indicating that the restart router 30 enters the GR state to the neighbor router 31.

After receiving the notification message sent by the communication module 11 of the restart router 30, the neighbor router 31 sends LSP packets to the communication module 11 of the restart router 30. The control module 12 is configured to recover the label information of, the control plane according to the LSP packets, and write the recovered label information to the label information storage module 13. Once a piece of label information is recovered, the added "Stale" mark is deleted.

The determining module 14 is started after the control module 12 enables the control plane to enter the GR state, and is configured to determine whether the label information in the label information storage module 13 is completely recovered; if the label information in the label information storage module 13 is completely recovered, the determining module 14 is configured to notify the control module 12 to enable the control plane to exit the GR state, and the control plane 12 forwards the label information stored in the label information storage module 13 to the label forwarding information storage module 15, and specifically, the determining module 14 may be one of the second implementation, the third implementation, or the fourth implementation of the router of the present invention; if the label information in the label information storage module 13 is not completely recovered, the determining module 14 is configured to notify the control module 12 to continue recovering the label information.

Figure 15:
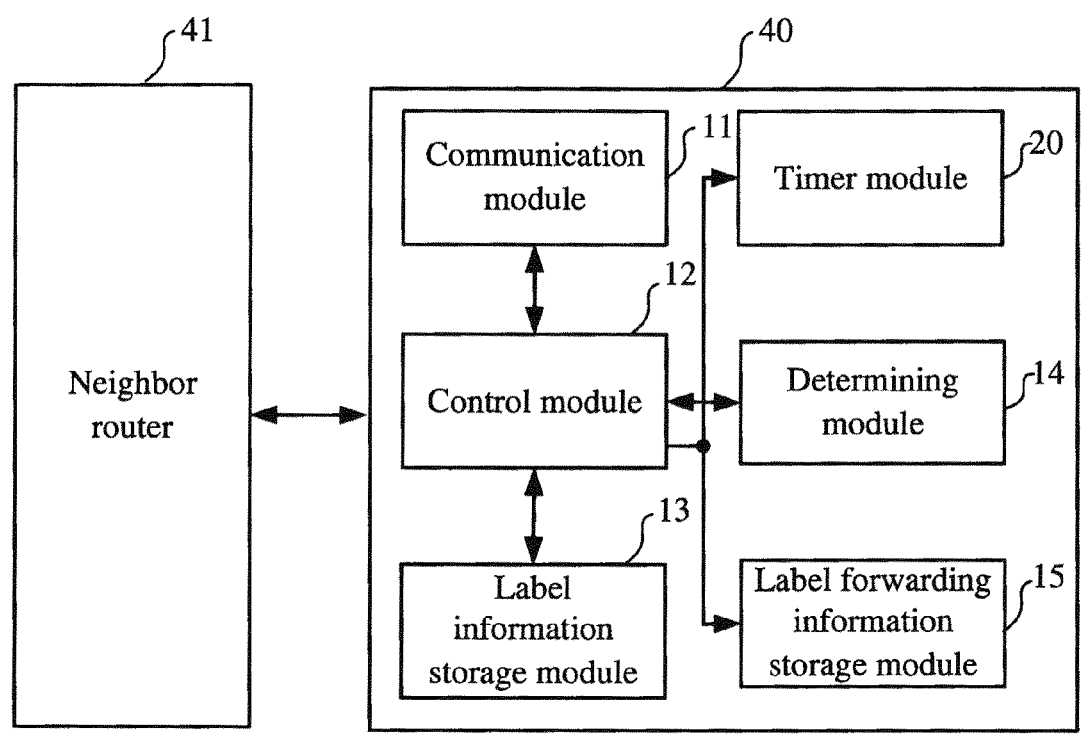
FIG. 15 is a schematic structural view of a second implementation of a communication network of the present invention.

FIG. 15 is a schematic structural view of a second implementation of a communication network of the present invention. Referring to FIG. 15, the communication network includes a restart router 40 and at least one neighbor router 41 connected to the restart router 40 (in this implementation, one neighbor router is taken for example in the illustration). The restart router 40 communicates with the at least one neighbor router 41.

The restart router 40 is in the same structure as the fifth implementation of the router of the preset invention, and includes a communication module 11, a control module 12, a label information storage module 13, a determining module 14, a label forwarding information storage module 15, and a timer module 20.

The control module 12 is configured to start a GR function after the router is faulty or after receiving other information indicating that the router needs to be restarted, and enable the control plane to enter a GR state. The control module 12 is further configured to add "Stale" marks to the label information in the label information storage module 13, control the communication module 11 to send a notification message indicating that the restart router 40 enters the GR state to the neighbor router 41, and start the determining module 14 and a timer of the timer module 20. Thus, the timer starts timing.

After receiving the notification message sent by the communication module 11 of the restart router 40, the neighbor router 41 sends LSP packets to the communication module 11 of the restart router 40.

The communication module 11 is configured to receive LSP packets sent by a neighbor router when the control plane enters the GR state. The control module 12 is configured to recover the label information of the control plane according to the LSP packets, write the recovered label information in the label information storage module 13, and delete the added "Stale" mark once apiece of the label information is recovered.

The determining module 14 is configured to determine whether the label information in the label information storage module 13 is completely recovered. If the determination result is yes, the determining module 14 notifies the control module 12 to enable the control module to exit the GR state, and the control module 12 forwards the label information stored in the label information storage module 13 to the label forwarding information storage module 15. Specifically, the determining module 14 may be one of the second implementation, the third implementation, or the fourth implementation of the router of the present invention. If the determination result is no, it is then determined whether the timer module 20 expires; if the timer module 20 expires, the determining module 14 notifies the control module 12 to enable the control module to exit the GR state, and the label information that is not recovered in the label information storage module 13 is deleted; if the timer module 20 does not expire, the determining module 14 notifies the control module 12 to continue recovering the label information.

In the implementations of the communication network of the present invention, the determining module 14 determines whether the label information in the label information storage module 13 is completely recovered, or further determines whether the timer module 20 expires, so as to decide whether the restart router exits the GR state. If the label information is completely recovered, the restart router can exit the GR state immediately. Thus, the time of exiting the GR state can be controlled precisely. In addition, this prevents such problem that some normal functions of the router cannot be enabled because recovering the LSPs is asynchronous with exiting the GR state, and thus the reliability of the router is improved and the reliability of the communication network is improved as well.

The implementations of the present invention are applicable to all protocols in which the timer is configured to control the time of exiting the GR state, for example, signaling protocols such as the Label Distribution Protocol (LDP), the Constraint-Based Label Distribution Protocol (CR-LDP), and the Resource Reservation Protocol (RSVP).

Through the above description of the implementations, it is clear to persons skilled in the art that the present invention may be accomplished through hardware, or through software plus a necessary universal hardware platform. Based on this, the technical solutions of the present invention may be embodied in the form of a software product. The software product may be stored in a nonvolatile storage medium (for example, CD-ROM, USB flash drive, or removable hard disk) and contain several instructions configured to instruct computer equipment (for example, a personal computer, a server, or network equipment) to perform the method according to the embodiments of the present invention.

It will be apparent to persons skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A router, comprising:
   a label information storage module, configured to store label information generated by a control plane of the router;
   a communication module, configured to receive label switched path (LSP) packets sent by a neighbor router when the control plane enters a graceful restart (GR) state;
   a control module, configured to recover the label information in the label information storage module according to the LSP packets;
   a determining module, configured to determine whether the label information of the control plane is completely recovered, and if the label information of the control plane is completely recovered, notify the control module to enable the control plane to exit the GR state, and forward the label information stored in the label information storage module to a label forwarding information storage module; and further comprising:
   a timer module, wherein
   the control module is further configured to start the determining module and the timer module when the control plane enters the GR state, and the determining module is further configured to determine whether the timer module expires when determining that the label information of the control plane is not completely recovered, and if the timer module expires, the control plane exits the GR state.

2. The router according to claim 1, wherein the control module is further configured to delete the label information not recovered in the label information storage module when the control plane exits the GR state because the timer module expires.

3. A graceful restart (GR) method of a router, the method comprising:
   receiving label switched path (LSP) packets sent by a neighbor router, when a control plane of the router enters a GR state, and recovering the label information of the control plane according to the LSP packets; and
   determining whether the label information of the control plane is completely recovered; if the label information of the control plane is completely recovered, exiting the GR state, and updating label information of a forwarding plane according to the recovered label information of the control plane;
   wherein the method further comprising:
   setting an amount and a preset value when the control plane enters the GR state, wherein the amount equals the preset value after a recursive operation is performed for a total amount of the label information before the GR times; wherein
   the recovering the label information of the control plane comprises: performing the recursive operation on the amount once a piece of the label information is recovered; and
   the determining whether the label information of the control plane is completely recovered comprises: determining whether the amount equals the preset value, wherein if the amount equals the preset value, the label information of the control plane is completely recovered.

4. The method according to claim 3, wherein an initial value of the amount is set to zero, a numerical value of the preset value is set to a total amount of label information before the GR, and the recursive operation is added by one.

5. The method according to claim 3, wherein
an initial value of the amount is set to a total amount of label information before the GR, a numerical value of the preset value is set to zero, and the recursive operation is subtracting by one.

6. A graceful restart (GR) method of a router, the method comprising:
receiving label switched path (LSP) packets sent by a neighbor router, when a control plane of the router enters a GR state, and recovering the label information of the control plane according to the LSP packets; and
determining whether the label information of the control plane is completely recovered; if the label information of the control plane is completely recovered, exiting the GR state, and updating label information of a forwarding plane according to the recovered label information of the control plane;
wherein the method further comprising:
adding aging marks to the label information of the control plane when the control plane enters the GR state; wherein
the recovering the label information of the control plane comprises: deleting the aging marks that are previously added to the corresponding label information once a piece of the label information is recovered; and
the determining whether the label information of the control plane is completely recovered comprises: traversing the label information of the control information, and determining whether the label information carries the aging marks, wherein if the label information does not carry the aging marks, the label information of the control plane is completely recovered.

7. A graceful restart (GR) method of a router, the method comprising:
receiving label switched path (LSP) packets sent by a neighbor router, when a control plane of the router enters a GR state, and recovering the label information of the control plane according to the LSP packets; and
determining whether the label information of the control plane is completely recovered; if the label information of the control plane is completely recovered, exiting the GR state, and updating label information of a forwarding plane according to the recovered label information of the control plane;
wherein the determining whether the label information of the control plane is completely recovered comprises: determining whether a notification message, which is sent by the neighbor router and indicates all LSP packets are announced, is received, wherein if the notification message is received, the label information of the control plane is completely recovered.

8. A graceful restart (GR) method of a router, the method comprising:
receiving label switched path (LSP) packets sent by a neighbor router, when a control plane of the router enters a GR state, and recovering the label information of the control plane according to the LSP packets; and
determining whether the label information of the control plane is completely recovered; if the label information of the control plane is completely recovered, exiting the GR state, and updating label information of a forwarding plane according to the recovered label information of the control plane;
wherein the method further comprising:
starting a timer when the control plane enters the GR state; and
determining whether the timer expires, when determining that the label information of the control plane is not completely recovered, and if the timer expires, exiting the GR state.

9. The method according to claim 8, wherein after exiting the GR state because the timer expires, the method further comprises: deleting the label information that is not recovered.

10. A communication network, comprising a restart router and at least one neighbor router communicating with the restart router, wherein the restart router comprises:
a label information storage module, configured to store label information generated by a control plane of the restart router;
a communication module, configured to receive label switched path (LSP) packets sent by the neighbor router when the control plane enters a graceful restart (GR) state;
a control module, configured to recover the label information in the label information storage module according to the LSP packets; and
a determining module, configured to determine whether the label information of the control plane is completely recovered, and if the label information of the control plane is completely recovered, notify the control module to enable the control plane to exit the GR state, and forward the label information stored in the label information storage module to a label forwarding information storage module;
wherein the control module is further configured to enable the control plane of the restart router to enter the GR state;
wherein the restart router further comprises a timer module, the control module is further configured to start the determining module and the timer module when the control plane enters the GR state, the determining module is further configured to determine whether the timer module expires when determining that the label information of the control plane is not completely recovered, and if the timer module expires, the control plane exits the GR state.

11. The communication network according to claim 10, wherein the control module is further configured to delete the label information not recovered in the label information storage module when the control plane exits the GR state because the timer module expires.

* * * * *